United States Patent [19]

Yoshida et al.

[11] 4,026,826

[45] May 31, 1977

[54] CURABLE RESIN COMPOSITION FOR FORMING ANTI-FOGGING ABRASION-RESISTANT COATING

[75] Inventors: Masaru Yoshida; Isao Kaetsu, both of Takasaki, Japan

[73] Assignee: Japan Atomic Energy Research Institute, Tokyo, Japan

[22] Filed: Oct. 6, 1975

[21] Appl. No.: 620,540

[30] Foreign Application Priority Data

Oct. 9, 1974 Japan .................................. 49-115638

[52] U.S. Cl. .................................. 260/2 S; 106/287 S; 106/287 SE; 106/287 SB; 204/159.13; 204/159.16; 204/159.18; 204/159.23; 204/159.24; 260/18 S; 260/46.5 R; 260/827; 526/279

[51] Int. Cl.² .................................. C08F 299/08

[58] Field of Search .............. 260/2 S, 46.5 R, 827, 260/18 S; 526/279; 204/159.13, 159.16, 159.18, 159.23, 159.24; 106/287 S, 287 SE, 287 SB

[56] References Cited

UNITED STATES PATENTS

| | | | |
|---|---|---|---|
| 3,575,910 | 4/1971 | Thomas | 260/827 |
| 3,666,539 | 5/1972 | Kiel | 260/827 |

*Primary Examiner*—Melvyn I. Marquis
*Attorney, Agent, or Firm*—Ladas, Parry, Von Gehr, Goldsmith & Deschamps

[57] ABSTRACT

A curable composition essentially consisting of certain alkoxysilane compounds and at least one compound represented by the formula

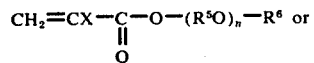

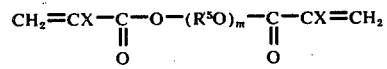

wherein $R^5$ is a lower alkylene group, $R^6$ is a lower alkyl group, $n$ is an integer of 2 – 20, and $m$ is an integer of 4 – 20, forms an excellent anti-fogging abrasion resistant coating on the surface of inorganic and organic transparent or mirror materials.

10 Claims, No Drawings

CURABLE RESIN COMPOSITION FOR FORMING ANTI-FOGGING ABRASION-RESISTANT COATING

BACKGROUND OF THE INVENTION

This invention relates to a curable resin composition useful for forming a coating with excellent anti-fogging property and abrasion-resistance on surface of transparent plastics, inorganic glass, mirror materials, etc.

Transparent plastics (so-called organic glass), inorganic glass, etc. are widely used as transparent materials. These materials, however, have some defects, and one of their most inconvenient defects is that they collect moisture and dew on their surfaces and thus are fogged when they are transferred into a hot and humid atmosphere or placed at a boundary between two atmospheres with large differences in temperature and humidity, for example, when they are used in bathrooms, kitchens, humid workshops, etc., or for vehicles such as automobiles in winter, and the like. Therefore, it is desired in various fields of application and it is of practical value to impart an anti-fogging property to transparent materials such as windowpanes or mirrors or eyeglasses and mask goggles to be used under those conditions. For this purpose, many attempts have been made to develop so-called coating methods for forming anti-fogging coatings on the surface of transparent materials or mirrors. For example, an anti-fogging coating mainly comprising poly(hydroxyethyl methacrylate) is well known. Indeed, this and any other anti-fogging coatings which hitherto have been proposed and provided are satisfactory in the anti-fogging function to a certain extent, but all of them lack abrasion resistance and are very easily scratched. Because of this fatal defect, they are not yet put to practical use.

From this point of view, with the aim of developing a composition capable of forming a coating which has both excellent anti-fogging function and high abrasion resistance and is of practical use for the protection of transparent materials or mirrors, we have studied a number of materials for coating and have discovered the present invention.

SUMMARY OF THE INVENTION

We have found that the above aim is accomplished by this invention by the use of a curable resin composition comprising a combination of hydrolysate of at least one silicon compound selected from those listed in (A) below and at least one polymerizable monomer selected from those in (B) below or its polymer or copolymer, a curing catalyst added to said combination.

(A) Silicon compounds represented by any of the formulas

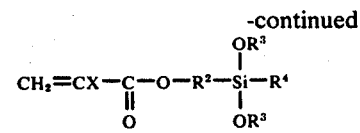
(I)

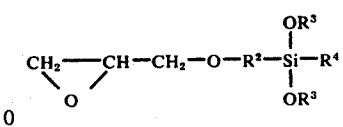
(II)

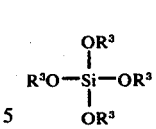
(III)

$$CH_2=CX-\underset{\underset{O}{\|}}{C}-O-R^2-\underset{\underset{OR^3}{|}}{\overset{\overset{OR^3}{|}}{Si}}-R^4 \quad (IV)$$

$$CH_2-CH-CH_2-O-R^2-\underset{\underset{OR^3}{|}}{\overset{\overset{OR^3}{|}}{Si}}-R^4 \quad (V)$$
    \O/ and $$R^3O-\underset{\underset{OR^3}{|}}{\overset{\overset{OR^3}{|}}{Si}}-OR^3 \quad (VI)$$

wherein $R^1$ is an alkylene groups having 2 – 6 carbon atoms, $R^2$ is an alkylene group having 2 – 4 carbon atoms, $R^3$ is an alkyl group having 1 – 4 carbon atoms, $R^4$ is either of $OR^3$ and an alkyl group having 1 – 3 carbon atoms, and X is either of hydrogen and methyl;

(B) Polymerizable compounds represented by either of the formulas

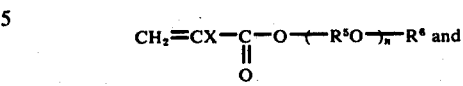

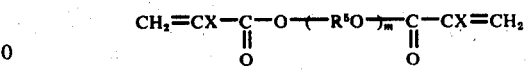

wherein $R^5$ is an alkylene group having 2 – 3 carbon atoms, $R^6$ is either hydrogen or an alkyl group having 1 – 3 carbon atoms, X is either of hydrogen and methyl, n is an integer of 2 – 20 and m is an integer of 4 – 20.

In the above formulas in (A) and (B), each of the groups $R^1$, $R^2$, $R^3$, $R^4$, $R^5$ and $R^6$ may be straight or branched.

DETAILED DESCRIPTION OF THE INVENTION:

The invention can be worked in various specific embodiments.

Examples of $R^1 - R^6$ are as follows:

$R^1$: $-CH_2CH_2-$, $-CH_2CH_2CH_2-$, $-CH_2CH-$, $-CHCH_2-$,
       |              |
       $CH_3$        $CH_3$ $-CH_2CH_2CH_2CH_2-$, $-CH_2CH_2CH_2CH_2CH_2-$,
$-CH_2CH_2CH_2CH_2CH_2CH_2-$ $R^2$: $-CH_3$, $-CH_2CH_3$, $-CH_2CH_2CH_3$,

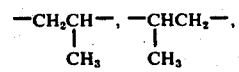

$R^3$: $-CH_3$, $-CH_2CH_3$, $-CH_2CH_2CH_3$,
$-CH(CH_3)_2$, $-CH_2CH_2CH_2CH_3$,

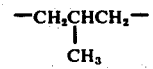

$R^4$: $-CH_3$, $-CH_2CH_3$, $-CH_2CH_2CH_3$,
$-CH(CH_3)_2$, $-OR^3$ wherein $R^3$ is as described in the above $-CH_2CH_2-$, $-CH_2CH_2CH_2-$,

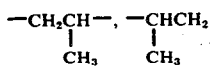

R*: —H, —CH₃, —CH₂CH₃, —CH₂CH₂CH₃, —CH(CH₃)₂

Specifically, the silicon compounds (A) to be used herein include: N-(β-aminoethyl)-β-aminoethyl-trimethoxysilane, N-(β-aminoethyl)-β-aminoethyl-triethoxysilane, N-(β-aminoethyl)-β-aminoethyl-tripropoxysilane, N-(β-aminoethyl)-β-aminoethyl-tributoxysilane, N-(β-aminoethyl)-γ-aminopropyltrimethoxysilane, N-(β-aminoethyl)-γ-aminopropyl-triethoxysilane, N-(β-aminoethyl)-γ-aminopropyl-tripropoxysilane, N-(β-aminoethyl)-γ-aminopropyl-tributoxysilane, N-(β-aminopropyl)-γ-aminoethyl-trimethoxysilane, N-(γ-aminopropyl)-β-aminoethyl-triethoxysilane, N-(γ-aminopropyl)-β-aminoethyltripropoxysilane, N-(γ-aminopropyl)-β-aminoethyl-tributoxysilane, N-(γ-aminopropyl)-γ-aminopropyl-trimethoxysilane, N-(γ-aminopropyl)-γ-aminopropyl-triethoxysilane, N-(γ-aminopropyl)-γ-aminopropyl-tripropoxysilane, N-(γ-aminopropyl-γ-aminopropyl-tributoxysilane, N-(β-aminoethyl)-β-aminoethylmethyl-dimethoxysilane, N-(β-aminoethyl)-β-aminoethyl-methyldiethoxysilane, N-(β-aminoethyl)-β-aminoethyl-methyl-dipropoxysilane, N-(β-aminoethyl-methyl-dibutoxysilane, N-(β-aminoethyl)-β-aminoethyl-ethyl-dimethoxysilane, N-(β-aminoethyl)-β-aminoethyl-ethyl-diethoxysilane, N-(β-aminoethyl)-β-aminoethyl-ethyl-dipropoxysilane, N-(β-aminoethyl)β-aminoethyl-ethyl-dibutoxysilane, N-(β-aminoethyl)-β-aminoethyl-propyl-dimethoxysilane, N-(β-aminoethyl)-β-aminoethylpropyl-diethoxysilane, N-(β-aminoethyl)-β-aminoethyl-propyldipropoxysilane, N-(β-aminoethyl)-β-aminoethylpropyldibutoxysilane, N-(β-aminoethyl)-γ-aminopropyl-methyldimethoxysilane, N-(β-aminoethyl)-γ-aminopropyl-methyldiethoxysilane, N-(β-aminoethyl)-γ-aminopropyl-methyldipropoxysilane, N-(β-aminoethyl)-γ-aminopropyl-methyl-dibutoxysilane, N-(β-aminoethyl)-γ-aminopropyl-ethyl-dimethoxysilane, N-(β-aminoethyl)-γ-aminopropyl-ethyl-diethoxysilane, N-(β-aminoethyl)-γ-aminopropyl-ethyl-dipropoxysilane, N-(βaminoethyl)-γ-aminopropyl-ethyl-dibutoxysilane N-(β-aminoethyl)-γ-aminopropyl-propyl-dimethoxysilane, N-(β-aminoethyl)γ-aminopropyl-propyl-diethoxysilane, N-(β-aminoethyl)-γ-aminopropyl-propyl-dipropoxysilane, N-(β-aminoethyl)-γ-aminopropyl-propyl-dibutoxysilane, N-(γ-aminopropyl)-β-aminoethyl-methyl-dimethoxysilane, N-(γ-aminopropyl)-β-aminoethylmethyl-diethoxysilane, N-(γ-aminopropyl)-β-aminoethyl-methyldipropoxysilane, N-(γ-aminopropyl)-β-aminoethyl-methyldibutoxysilane, N-(γ-aminopropyl)-β-aminoethyl-ethyl-dimethoxysilane, N-(γ-aminopropyl)-γ-aminoethyl-ethyl-diethoxysilane, N-(γ-aminopropyl)-γ-aminipropyl)-γaminoethyl-ethyl-dipropoxysilane, N-(γ-aminopropyl)-β-aminoethyl-ethyl-dibutoxysilane, N-(γ-aminopropyl)-β-aminoethyl-propyl-dimethoxysilane, N-(γ-aminopropyl)β-aminoethyl-propyl-diethoxysilane, N-(γ-aminopropyl)-β-aminoethyl-propyldipropoxysilane, N-(γ-aminopropyl)-β-aminoethyl-propyl-dibutoxysilane, N-(γ-aminopropyl)-γ-aminopropyl-methyl-dimethoxysilane, N-(γ-aminopropyl)-γ-aminopropylmethyl-diethoxysilane, N-(γ-aminopropyl)-γ-aminopropyl-methyldipropoxysilane, N-(γ-aminopropyl)-γ-aminopropyl-methyldibutoxysilane, N-(γ-aminopropyl)γ-aminopropyl-ethyl-dimethoxysilane, N-(γ-aminopropyl)-γ -aminopropyl-ethyl-diethoxysilane, N-(γ-aminopropyl)-γ-aminopropyl-ethyl-dipropoxysilane, N-(γ-aminopropyl)-65 -aminopropyl-ethyl-dibutoxysilane, N-(γ-aminopropyl)γ-aminopropyl-propyl-dimethoxysilane, N-(γ-aminopropyl)γ-aminopropyl-propyl-diethoxysilane, N-(γ-aminopropyl)-γ-aminopropyl-dipropoxysilane, N-(γ-aminopropyl)-γ-aminopropylpropyl-dibutoxysilane, vinylmethyl-dimethoxysilane, vinylmethyl-diethoxysilane, vinyl-methyl-dipropoxysilane, vinylmethyl-dibutoxysilane, vinyl-ethyl-dimethoxysilane, vinylethyl-diethoxysilane, vinyl-ethyl-dipropoxysilane, vinylethyldibutoxysilane, vinyl-propyl-dimethoxysilane, vinylpropyl-diethoxysilane, vinyl-propyl-dipropoxysilane, vinylpropyl-dibutoxysilane, vinyltrimethoxysilane, vinyltriethoxysilane, vinyltripropoxysilane, vinyltributoxysilane, β-acryloxyethyl-trimethoxysilane, β-acryloxyethyl-triethoxysilane, β-acryloxyethyl-tripropoxysilane, β-acryloxyethyltributoxysilane, γ-acryloxypropyl-trimethoxysilane, γ-acryloxypropyl-triethoxysilane, γ-acryloxypropyl-tripropoxy silane, γ-acryloxypropyl-tributoxysilane, β-acryloxyethyl-methyldimethoxysilane, β-acryloxyethyl-methyl-diethoxysilane, β-acryloxyethyl-methyl-dipropoxysilane, β-acryloxyethyl-methyldibutoxysilane, γ-acryloxypropyl-methyldimethoxysilane, γ-acryloxypropyl-methyl-diethoxysilane, γ-acryloxypropyl-methyldipropoxysilane, γ-acryloxypropyl-methyl-dibutoxysilane, β-acryloxyethyl-ethyl-dimethoxysilane, β-acryloxyethyl-ethyldiethoxysilane, β-acryloxyethyl-ethyl-dipropoxysilane, β-acryloxyethyl-ethyl-dibutoxysilane, γ-acryloxypropyl-ethyldimethoxysilane, γ-acryloxypropyl-ethyl-diethoxysilane, γ-acryloxypropyl-ethyl-dipropoxysilane, γ-acryloxypropyl-ethyl-dibutoxysilane, γ-acryloxypropyl-propyl-dimethoxysilane, γ-acryloxypropyl-propyl-diethoxysilane, γ-acryloxypropylpropyl-dipropoxysilane, γ-acryloxypropyl-propyl-dibutoxysilane, β-methacryloxyethyl-trimethoxysilane, β-methacryloxyethyltriethoxysilane, β-methacryloxyethyl-tripropoxysilane, βmethacryloxy-ethyl-tributoxysilane, γ-methacryloxypropyltrimethoxysilane, γ-methacryloxypropyl-triethoxysilane, γmethacryloxypropyl-tripropoxysilane, γ-methacryloxypropyltributoxysilane, β-methacryloxyethyl-methyl-dimethoxysilane, β-methacryloxyethylmethyl-diethoxysilane, β-methacryloxyethylmethyl-dipropoxysilane, β-methacryloxyethyl-methyl-dibutoxysilane, γ-methacryloxypropyl-methyl-dimethoxysilane, γ-methacryloxypropyl-methyl-diethoxysilane, γ-methacryloxypropylmethyl-dipropoxysilane, γ-methacryloxypropyl-methyl-dibutoxysilane, β-methacryloxyethyl-ethyl-dimethoxysilane, β-methacryloxyethyl-ethyl-dipropoxysilane, β-methacryloxyethyl-ethyl-dibutoxysilane, γ-methacryloxypropyl-ethyl-dimethoxysilane, γ-methacryloxypropyl-ethyl-diethoxysilane, γ-methacryloxypropyl-ethyl-dipropoxysilane, γ-methacryloxypropyl-ethyldibutoxysilane, γ-methacryloxypropyl-propyl-dimethoxysilane, γ-methacryloxypropyl-propyl-diethoxysilane, γ-methacryloxypropyl-propyl dipropoxysilane, γ-methacryloxypropyl-propyldibutoxysilane, β-glycidoxyethyl-trimethoxysilane, β-glycidoxyethyl-triethoxysilane, β-glycidoxyethyl-tripropoxysilane, β-glycidoxyethyl-tributoxysilane, γ-glycidoxypropyl-trimethoxysilane, γ-glycidoxypropyl-triethoxysilane, γ-glycidoxypropyltripropoxysilane, γ-glycidoxypropyl-tributoxysilane, β-glycidoxypropyl-trimethoxysilane, β-glycidoxypropyl-triethoxysilane, β-glycidoxypropyl-tripropoxysilane, β-glycidoxypropyltributoxysilane, β-glycidoxyethyl-methyl-dimethoxysilane, β-glycidoxyethyl-methyl-diethoxysilane, β-glycidoxyethylmethyl-dipropoxysilane, γ-glycidoxypropyl-methyl dimethoxysilane, γ-glycidoxypropyl-methyl-diethoxysilane, γ-glycidoxypropyl-methyl-dipropoxysilane, γ-glycidoxypropyl-methyldibutoxysilane, β-glycidoxypropyl-methyl-dimethoxysilane, β-glycidoxypropylmethyl-diethoxysilane, β-glycidoxypropylmethyl-dipropoxysilane, β-glycidoxypropyl-methyl-dibutoxysilane, β-glycidoxyethyl-ethyl-dimethoxysilane, β-glycidoxyethyl-ethyl-diethoxysilane, β-glycidoxyethyl-ethyl-dipropoxysilane, β-glycidoxyethyl-ethyl-dibutoxysilane, γ-glycidoxypropyl-ethyl-dimethoxysilane, γ-glycidoxypropyl-ethyldiethoxysilane, γ-glycidoxypropyl-ethyl-dipropoxysilane, γ-glycidoxypropyl-ethyl-dibutoxysilane, β-glycidoxypropylethyl-dimethoxysilane, β-glycidoxypropyl-ethyl-diethoxysilane, β-glycidoxypropyl-ethyl-dipropoxysilane, β-glycidoxypropylethyl-dibutoxysilane, β-glycidoxyethyl-propyl-dimethoxysilane, β-glycidoxyethyl-propyl-diethoxysilane, β-glycidoxyethylpropyl-dipropoxysilane, β-glycidoxyethyl-propyl-dibutoxysilane, γ-glycidoxypropyl-propyl-dimethoxysilane, γ-glycidoxypropylpropyl-diethoxysilane, γ-glycidoxypropyl-propyl-dipropoxysilane, γ-glycidoxypropyl-propyl-dibutoxysilane, β-glycidoxypropylpropyl-dimethoxysilane, β-glycidoxypropyl-propyl-diethoxysilane, β-glycidoxypropyl-propyl-dipropoxysilane, β-glycidoxypropylpropyl-dibutoxysilane, tetramethoxysilane, tetraethoxysilane, tetrapropoxysilane, tetrabutoxysilane.

Specific examples of the polymerizable compounds (B) include: methoxydiethylene-glycol monoacrylate, methoxydiethylene-glycol monomethacrylate, methoxytriethylene-glycol monoacrylate, methoxytriethylene-glycol monomethacrylate, methoxytetraethylene-glycol monoacrylate, methoxytetraethylene-glycol monomethacrylate, methoxypentaethylene-glycol monoacrylate, methoxypentaethylene-glycol monomethacrylate, methoxyhexaethylene-glycol monoacrylate, methoxyhexaethylene-glycol monomethacrylate, methoxyheptaethylene-glycol monoacrylate, methoxyheptaethylene-glycol monomethacrylate, methoxypolyethylene-glycol monoacrylate, methoxyethylene-glycol monoethacrylate, ethoxydiethylene-glycol monacrylate, ethoxydiethylene-glycol monomethacrylate, ethoxytriethyleneglycol monoacrylate, ethoxytriethylene-glycol monomethacrylate, ethoxytetraethylene-glycol monoacrylate, ethoxytetraethyleneglycol monomethacrylate, ethoxypentaethylene-glycol monoacrylate, ethoxypentaethylene-glycol monomethacrylate, ethoxyhexaethylene-glycol monoacrylate, ethoxyhexaethylene-glycol monomethacrylate, ethoxyheptaethylene-glycol monoacrylate, ethoxyheptaethylene-glycol monomethacrylate, ethoxypolyethyleneglycol monoacrylate, ethoxypolyethylene-glycol monomethacrylate, propoxydiethylene-glycol monoacrylate, propoxydiethyleneglycol monomethacrylate, propoxytriethylene-glycol monoacrylate, propoxytriethylene-glycol monomethacrylate, propoxytetraethyleneglycol monoacrylate, propoxytetraethylene-glycol monomethacrylate, propoxypentaethylene-glycol monoacrylate, propoxypentaethyleneglycol monomethacrylate, propoxyhexaethylene-glycol monoacrylate, propoxyhexaethylene-glycol monomethacrylate, propoxyheptaethylene-glycol monoacrylate, propoxyheptaethylene-glycol monoethacrylate, propoxypolyethylene-glycol monoacrylate, propoxyethylene-glycol monomethacrylate, methoxydipropyleneglycol monoacrylate, methoxydipropylene-glycol monomethacrylate, methoxytripropylene-glycol monoacrylate, methoxytripropyleneglycol monomethacrylate, methoxytetrapropylene-glycol monoacrylate, methoxytetrapropyleneglycol monomethacrylate, methoxypolypropyleneglycol monoacrylate, methoxypolypropylene-glycol monomethacrylate, ethoxydipropylene-glycol monoacrylate, ethoxydipropylene-glycol monomethacrylate, ethoxytripropylene-glycol monoacrylate, ethoxytripropyleneglycol monomethacrylate, ethoxytetrapropylene-glycol monoacrylate, ethoxytetrapropylene-glycol monomethacrylate, ethoxypolypropylene-glycol monoacrylate, ethoxypolypropylene-glycol monomethacrylate, propoxydipropylene-glycol monoacrylate, propoxydipropylene-glycol monomethacrylate, propoxytripropylene-glycol monoacrylate, propoxytripropylene-glycol monomethacrylate, propoxytetrapropylene-glycol monoacrylate, propoxytetrapropyleneglycol monomethacrylate, propoxypolypropyleneglycol monoacrylate, propoxypolypropylene-glycol monomethacrylate, tetraethylene-glycol diacrylate, tetraethylene-glycol dimethacrylate, pentaethyleneglycol diacrylate, pentaethylene-glycol dimethacrylate, hexaethylene-glycol diacrylate, hexaethylene-glycol dimethacrylate, heptaethylene-glycol diacrylate, heptaethylene-glycol dimethacrylate, polyethylene-glycol diacrylate, polyethylene-glycol dimethacrylate, tetraethylene-glycol monoacrylate, tetraethylene-glycol monomethacrylate, pentaethylene-glycol monoacrylate, pentaethylene-glycol monomethacrylate, hexaethylene-glycol monoacrylate, hexaethylene-glycol monomethacrylate, heptaethylene-glycol monoacrylate, heptaethylene-glycol monomethacrylate, polyethylene-glycol monoacrylate, polyethylene-glycol monomethacrylate.

Specific examples of the curing catalyst to be used herein include: sulfuric acid, hydrochloric acid, chlorosulfonic acid, p-toluenesulfonic acid, trichloroacetic acid, phosphoric acid, polyphosphoric acid, pyrophosphoric acid, anhydrous iodic acid, hydrogen bromide, iodine, periodic acid; Lewis acids such as tin tetrachloride, boron trifluoride, titanium tetrachloride, aluminum trichloride, ion trichloride, etc, and complexes thereof with ethers or alcohols; cobalt laurate, zinc laurate, cobalt naphthenate, zinc naphthenate, zinc octylate, cobalt octylate, triphenoxyboron; and other curing catalysts having the effect equal to the above-mentioned catalysts and being capable of reacting with the active hydroxyl groups of the hydrolyzed silicon compounds so as to promote the condensation reaction and cure the compounds.

The coatings obtained by curing the hydrolysates of compounds (A) have considerably good abrasion resistance, but have little anti-fogging function. On the other hand, the polymers or copolymers of monomers (B) have remarkable hydrophilic property, but are so poor in abrasion resistance and surface hardness. Therefore they are usually not used alone. Generally, when a component which is excellent in abrasion resistance but poor in hydrophilic property is arbitrarily combined with another component which has high hydrophilic property but is inferior in abrasion resistance, the abrasion resistance and hydrophilic property of the resulting mixture are, in most cases, inferior to those of the respective components due to mutual impairment rather than mutual compensation and practically useful products cannot be obtained. In addition, different components are often poor in mutual compatibility. Particularly, in the case where optical uniformity and excellent light transmittance of film are required as in transparent coatings, there is no way other than to screen a tremendous number of combinations of components to find, with enormous effort and keen insight, a few effective combinations.

We have investigated numerous combinations of abrasion-resistant components and hydrophilic components in order to find suitable compositions which form a coating that retains abrasion resistance and an antifogging property comparable to the respective components, and possesses uniformity and transparency, and we have come upon the composition of this invention which comprises a hydrolysate of the above-mentioned silicon compound (A), a member of the above-mentioned monomer (B) or its polymer or copolymer and a curing catalyst.

To prepare the composition according to the invention, a mixture of a hydrolysate of silicon compound (A) and monomer (B) or its polymer or copolymer is prepared. When a mixture of the hydrolysate of silicon compound (A) and monomer (B) is prepared, it may be prepared by mixing (A) and (B), thereafter hydrolyzing (A), or alternatively hydrolyzing (A) previously and then mixing it with (B). When the composition is prepared by mixing a hydrolysate of silicon compound (A) and a polymer or copolymer of monomer (B) it may be prepared by previously hydrolyzing (A) and then mixing it with (B), and then polymerizing (B) by any suitable means such as heating the mixture in the presence of a radical-polymerization catalyst or irradiating with light or with ionizing radiation. Alternatively, a previously prepared hydrolysis product of (A) may be mixed with a polymer or copolymer of (B) which has been also previously prepared by polymerization of (B) in a separate vessel. Other methods of preparing the composition are by mixing (A) and then (B), and subjecting (A) to hydrolysis and (B) to polymerization in the mixed state, or by mixing (A) and a previously prepared polymer or copolymer of (B), and then hydrolyzing (A).

A mixture of hydrolysate of (A), (B) and a curing catalyst may also be applied on the surface of a substrate to be coated and thereafter light or an ionizing radiation is applied thereto so as to obtain a mixture of the hydrolysate of (A) and a polymer or copolymer of (B) on the surface of the substrate. In this case, a curable resin composition is obtained in the form of a coating already applied on a substrate, rather than a coating solution to be applied thereon, and this is, of course, included in this invention as one embodiment.

Also, the mixture of the hydrolysate of (A), (B) and a curing catalyst is included in itself in the present invention. When this mixture is applied on the surface of a substrate and light or an ionizing radiation is then applied thereto with heating, polymerization of (B) and curing of the coating take place at the same time and a coated film is obtained in one step.

Hydrolysis of the silicon compound (A) is conducted in a medium consisting of water and a water-soluble organic solvent or consisting of water, a water-soluble organic solvent and another organic solvent which, when mixed with a water-soluble organic solvent, becomes water-soluble. Organic solvents to be used for this purpose include methanol, ethanol, propanol, isopropanol, dioxane, acetone, methyl ethyl ketone, glycerine, ethylene glycol, phenol, benzyl alcohol, diethylene glycol, etc. If necessary, the hydrolysis may be carried out in the presence of a hydrolysis catalyst such as sulfuric acid, hydrochloric acid, chlorosulfonic acid, sulfuryl chloride, iron chloride, ethyl borate, cobalt naphthenate, zinc naphthenate, iron naphthenate, cobalt octylate, zinc octylate, iron octylate, zinc laurate, cobalt laurate, iron laurate, ammonia, potassium hydroxide, sodium hydroxide, etc.

The radical polymerization catalysts to be used for polymerization of monomers (B) include any polymerization initiator capable of initiating polymerization of usual radically polymerizable monomers, such as peroxides, hydroperoxides, dinitriles, redox catalyst systems, etc.

The light or ionizing radiations to be used for the polymerization of monomers (B) include visible and ultraviolet rays from a low-pressure or high-pressure mercury lamp, sunbeams, $\alpha$-rays, $\beta$-rays, $\gamma$-rays, electron beams, X-rays, neutron beams, mixed radiations emitted from a nuclear reactor, wherein wavelength of the light is within a range of 1500 – 7000A and dose rate of the radiations is within a range of $1 \times 10^2 - 1 \times 10^{10}$ rad per hour.

The hydrolysate of silicon compound (A) and monomer (B) or its polymer or copolymer may be combined so that (A) is present in an amount of 20 – 90%, preferably 35 – 85%, more preferably 50 – 80% based on the total weight of the hydrolysate of (A) and monomer (B) or its polymer or copolymer.

The curable resin compositions according to the invention also contain a curing catalyst in addition to the hydrolysate of (A) and monomer (B) or its polymer or copolymer. The curing catalyst may be added in any mode and at any stage of mixing. For example, it may be added to a mixture of (A) and (B), which is then subjected to hydrolysis of (A) and, as the case may be polymerization of (B). It may also be added at a stage such that a hydrolysate of (A) has been mixed with a polymer and copolymer of (B); or it is also possible to add it at those stages that a hydrolysate of (A) and (B) itself, or (A) itself and a polymer or copolymer of (B) has been mixed. The amount of the curing catalyst to be added is 0.01 – 10%, preferably 0.1 – 7.5%, more preferably 0.5 – 5% based on the total weight of (A) and (B).

In addition to the above mentioned essential components, the curing composition of the invention may further contain a solvent. The solvent is not particularly defined as an essential component, but in most cases it is incorporated in the composition either by intentional addition of said solvent or as a result of mixing of the essential components. These solvent-containing compositions are also encompassed within the present invention.

Suitable solvents to be used herein include, in addition to the above-mentioned solvents which can be used for the hydrolysis of silicon compound (A), benzene, toluene, xylene, chloroform, carbon tetrachloride, methyl acetate, ethyl acetate, etc.

In one embodiment of the invention, one or more monomers selected from (B), or a polymer or copolymer of (B) is replaced with a mixture of monomer(s) (B) and at least one monomer other than (B), the latter being present in an amount of not more than 30%, preferably less than 20%, more preferably less than 10% by weight based on the weight of the monomer(s) (B), or the polymer or copolymer of (B). The monomer other than (B) is added in a relatively small amount in order to improve various practical properties of the resulting coating other than abrasion resistance and anti-fogging property, such as thermal resistance, chemical resistance, weatherability, water proofing property, adhesion to various substrates, etc. and to adjust the balance of these properties. The selection of monomers other than (B) is dependent on the particular application of the composition.

Specific examples of the monomers other than (B) to be used in the invention include methyl acrylate, ethyl acrylate, propyl acrylates, butyl acrylates, methyl methacrylate, ethyl methacrylate, propyl methacrylates, butyl methacrylates, hydroxyethyl acrylate, hydroxypropyl acrylate, hydroxyethyl methacrylate, hydroxypropyl methacrylate, 2-ethylhexyl acrylate, cyclohexyl acrylate, lauryl acrylate, acrylic acid, 2-ethylhexyl methacrylate, cyclohexyl methacrylate, lauryl methacrylate, stearyl methacrylate, benzyl methacrylate, phenyl methacrylate, methacrylic acid, styrene, α-methylstyrene, vinyltoluene, vinylpyrrolidone, acrylamide, methacrylamide, acrylonitrile, methacrylonitrile, tribromophenyl methacrylate, methacryloxyethyl phosphate, trimethacryloxyethyl phosphate, dialkyl phthalate, triallyl cyanurate, epoxy acrylate, diethylene-glycol dimethacrylate, diethylene-glycol diacrylate, ethylene-glycol dimethacrylate, ethylene-glycol diacrylate, triethylene-glycol dimethacrylate, triethylene-glycol diacrylate, triacrylformal, diacetone-acrylamide, methylolacrylamide, methylene-bisacrylamide, diethylene-glycol bisallyl carbonate, propargyl maleate, propargyl fumarate, diallyl maleate, diallyl fumarate, diallyl itaconate, diallyl succinate, etc.

The curable resin composition of the invention obtained in the above-mentioned manner can be used for forming a coating on the surfaces of various substrates. For this purpose, the curable resin composition is applied on the surface of plastics, inorganic glass, transparent ceramics, metals, mirror materials or the like and the coated film is then cured by any suitable means, such as, by heating it at 50°–300° C, preferably 60°–200° C, or by applying thereto an ionizing radiation during or after heating. The cured coating is firmly bonded to the substrate and is particularly excellent in abrasion resistance and anti-fogging property, providing highly useful composite products.

The following examples are intended only to illustrate the invention. In the examples, parts are by weight unless otherwise indicated.

EXAMPLE 1

To 100 parts of N-(β-aminoethyl)-γ-aminopropyl-trimethoxysilane, 100 parts of methanol and 30 parts of a 10% aqueous potassium hydroxide solution were added and the mixture was heated at 67° C for 30 hours to hydrolyze the silicon compound, the solvent being distilled off.

To 70 parts of the thus obtained hydrolysate solution, 30 parts of methoxytetraethylene-glycol monomethacrylate and 7 parts of 1.0% cobalt naphthenate solution in benzene were added in order to prepare a coating solution. The coating solution was applied on the surface of a polymethyl methacrylate sheet (3 mm thick) by dipping, then irradiated with γ-rays at a dose rate of $1 \times 10^6$ R/hr for 2 hours at room temperature and heated for 1 hour at 100° C and then for 16 hours at 60° C so as to cure it. The resulting transparent rigid coating was 15μ in thickness and had pencil hardness of 5H. The haze value measured by sand falling test was 10.1%, which is comparable to that of inorganic glass (9.3%) and indicates remarkable increase in abrasion resistance. When the weather-ability of the coated composite was tested by weathering it for 3 months outdoors, it showed on appearance almost the same as that before the test and still had light transmittance exceeding 90%. The coating had excellent anti-fogging property and it collected on moisture on its surface when it was breathed upon in the open air at 7° C in winter.

EXAMPLE 2

To 100 parts of tetramethoxysilane, 50 parts of water, 100 parts of methanol and 0.1 part of hydrochloric acid were added and the mixture was heated at 40° C for 30 hours for hydrolyzing tetramethoxysilane, the solvent being distilled off.

A coating solution was prepared as follows. To 50 parts of the hydrolysate solution prepared as above, 50 parts of triethylene-glycol monomethacrylate and 5 parts of a 1.0% cobalt naphthenate solution in benzene were added, and further 10 parts of a solution containing 1% of a surfactant, FC-430 (Hishie Kagaku Co., Ltd.) in methanol was added in order to improve wetting by the coating solution of the substrate sheet of diethylene-glycol-bisallylcarbonate polymer. The thus prepared coating solution was applied to the surface of the substrate (3 mm thick) by spraying so as to obtain a test piece. The test piece was placed in an oven equipped with a temperature control device and then subjected to radiation-heating curing at 80° C for 2 hours in a nitrogen atmosphere under irradiation of γ-rays from Co-60 at a dose rate of $1 \times 10^6$ R/hr. Thus a transparent hard coating was formed on the polymer sheet. The coating was 10μ in thickness, had excellent anti-fogging property and pencil hardness of 7H, and collected no moisture on its surface when it was breathed upon in a room at 20° C. When being scratched with steel wool, its hardness was far superior to that of the substrate material, diethylene-glycol-bisallylcarbonate polymer. The haze value measured after the sand-falling test was 9.8% as against 28.4% of the substrate, which indicates that the abrasion resistance is excellent and comparable to that of inorganic glass. It was also found that the coating was excellent in water-resistance, thermal resistance and chemical resistance.

EXAMPLE 3

To 100 parts of tetrabutoxysilane, 50 parts of water, 100 parts of n-butanol and 0.1 part of hydrochloric acid were added and the mixture was heated at 50° C for 20 hours for hydrolyzing tetrabutoxysilane, the solvent being distilled off.

To 30 parts of the thus prepared hydrolysate solution, 70 parts of polyethylene-glycol diacrylate (the average number of $C_2H_4O$ unit is 14) and 5 parts of 1.0% cobalt naphthenate solution in benzene and further 0.001 part of FC-430 surfactant were added and mixed well. Thus a coating solution was prepared. The coating solution was applied on the surface of a sheet of diethylene-glycol-bisallylcarbonate polymer with a brush to provide a test piece. The test piece was placed in an oven equipped with a temperature control device and subjected to radiation-heating curing at 70° C for 2 hours in a nitrogen atmosphere under irradiation of γ-rays at a dose rate of $5 \times 10^5$ R/hr to form a transparent hard coating. This coating was 10μ in thickness and had pencil hardness of 6H. The haze value measured after the sand-falling test was 10.2%, which means that the coating had excellent abrasion resistance. It was also found that the coating was excellent in water resistance, thermal resistance and chemical resistance. The coating had excellent anti-fogging property and collected no moisture on its surface when it was transferred from the open air at 10° C into a workroom at 32° C saturated with steam.

EXAMPLE 4

To a mixture of 100 parts of vinyltriethoxysilane and 40 parts of tetraethylene-glycol monomethacrylate were added a mixed solvent of 100 parts of ethanol and 30 parts of benzyl alcohol and 50 parts of 10% aqueous potassium hydroxide solution and the resulting mixture was then irradiated with $1 \times 10^6$ rad of electron beams of 2 MeV emitted from an electron accelerator so as to obtain a composition comprising a hydrolysate of vinyltriethoxysilane and a polymer of tetraethylene-glycol monomethacrylate. After the addition of 10 parts of 1.0% zinc octylate solution in benzene thereto, the composition was applied on the surface of inorganic glass, and then heated for 1 hour at 100° C and 15 hours at 60° C so as to cure it.

The resulting cured coating was highly anti-fogging and, when it was breathed upon in the open air at 7° C, it collected no moisture on its surface. It had light transmittance exceeding 90% and the haze value measured after the sand-falling test was 14.5%.

EXAMPLE 5

Fifty parts of β-methacryloxyethyl-trimethoxysilane was mixed with 50 parts of methoxytriethylene-glycol monoacrylate polymer which has been prepared by heating the monomer containing 0.5% ammonium persulfate for 18 hours at 60° C and the mixture was then dissolved in a solvent consisting of 100 parts of water, 100 parts of methanol and 10 parts of ethylene glycol. After the addition of 0.1 part of concentrated sulfuric acid, the solution was heated for 35 hours at 60° C so as to hydrolyze the silicon compound and provide a mixture of the hydrolysate of β-methyacryloxyethyl-trimethoxysilane and poly(methoxytriethylene-glycol monoacrylate).

Subsequently a coating solution was prepared by adding 5 parts of a 1.0% cobalt octylate solution in acetone to the obtained mixture and it was applied on the surface each of a polished aluminum mirror and a chrome-plated iron mirror with a brush and then heated for 5 hours at 100° C and 10 hours at 60° C so as to provide to cured coating. When the two mirrors were exposed to steam evaporated from a water bath of 50° C in a room at 30° C, neither of them collected moisture on its surface. Both were not scratched when they were rubbed with steel wool.

EXAMPLE 6

To 100 parts of γ-glycidoxypropyl-trimethoxysilane were added 100 parts of methanol, 10 parts of glycerine and 30 parts of a 10% aqueous potassium hydroxide solution and the mixture was then allowed to stand at 68° C for 30 hours so as to hydrolyze the silicon compound. To 70 parts of the thus obtained solution containing the hydrolysate were added 40 parts of tetraethylene-glycol dimethacrylate, 5 parts of acrylic acid and 5 parts of triacrylformal followed by the addition of 5 parts of 1% perchloric acid solution in 1:1 chloroform/acetone. To the mixture, $1 \times 10^6$ roentgens of γ-rays were applied at a dose rate of $5 \times 10^5$ Roentrgens per hour at room temperature so as to provide a mixture comprising the hydrolysate of γ-glycidoxypropyl-trimethoxysilane and a tetraethylene-glycol dimethacrylate/acrylic acid/triacrylformal copolymer.

To this mixture, 5 parts of 2% zinc laurate solution in benzene was added and mixed well. The mixture was applied on the surface of a polymethyl methacrylate sheet by spraying and heated for 2 hours at 60° C and 10 hours at 85° C so as to cure the coating. As compared with a cured coating wherein the tetraethylene-glycol dimethacrylate/acrylic acid/triacrylformal copolymer was replaced by poly(tetraethylene-glycol dimethacrylate), it was found that the cured coating of this example was excellent in water resistance and in particular its hardness scarcely decreased after it had been contacted with water for a long time. The cured coating had excellent anti-fogging property an collected no moisture when contacted with steam evaporated from a water bath of 50° C in a room at 10° C. The haze value measured after the sand-falling test was 14.1% (as against 50 – 60% for polymethyl methacrylate), which indicates that abrasion resistance was much improved.

EXAMPLE 7 – 10

According to the procedures of Example 1, instead of N-(β-aminopropyltrimethoxysilane (A) and methoxytetraethyleneglycol monomethacrylate (B), compounds as indicated in Table 1 were used and coatings were formed on the surface of methyl methacrylate polymer sheets. The properties of the formed coatings are shown in the same table.

When diethyleneglycol bis-allylcarbonate polymer sheets were used as the substrate instead of methyl methacrylate polymer sheets, coatings of almost the same properties were obtained.

EXAMPLE 11 – 13

According to the procedures of Example 2, instead of tetramethoxysilane (A) and triethyleneglycol monomethacrylate (B), compounds as indicated in Table 2 were used and coatings were formed on the surface of diethyleneglycol bis-allylcarbonate polymer sheets or methyl methacrylate polymer sheets. The properties of the formed coatings are shown in the same table.

EXAMPLE 14 – 17

According to the procedures of Example 3, instead of tetrabutoxysilane (A) and polyethylene diacrylate (B), compounds as indicated in Table 2 were used and coatings were formed on the surface of the substrates as indicated in the table. The properties of the formed coatings are shown in the same table.

EXAMPLE 18 – 20

According to the procedures of Example 6, γ-glycidoxy-propyltrimethoxysilane (A), tetraethyleneglycol dimethacrylate (40 parts), acrylic acid (5 parts) and triacrylformal (5 parts) (B), compounds as shown in Table 3 were used and coatings were formed on the surface of the substrates indicated in the table. The properties of the formed coatings are shown in the same table.

Table 1

| Ex. No. | Component (A) | Component (B) | Substrate material | Thickness of coating | Pencil hardness | Haze value (%) | Weatherability (after 3 months outdoors) Pencil hardness | Weatherability Haze value | Weatherability Light transmittance | Anti-fogging property |
| --- | --- | --- | --- | --- | --- | --- | --- | --- | --- | --- |
| 7. | N-(β-aminoethyl)-β-aminoethyltriethoxysilane | tetraethyleneglycol diacrylate | polymethyl methacrylate | 12 μ | 5 H | 11.2 | no change | no change | 91 % | Not fogged when breathed on in an atmosphere at 10° C. |
| 8. | N-(γ-aminopropyl)-γ-aminopropyltrimethoxysilane | methoxypolyethyleneglycol monomethacrylate | polymethyl methacrylate | 15 μ | 6 H | 10.7 | no change | no change | 92 % | Not fogged when breathed on in an atmosphere at 10° C. |
| 9. | N-aminomethyl-β-aminoethyl-trimethoxysilane | tetraethyleneglycol monoacrylate | polymethyl methacrylate | 9 μ | 5 H | 12.2 | no change | no change | 91 % | Not fogged when breathed on in an atmosphere at 10° C. |
| 10. | N-(γ-aminopropyl)-β-aminoethyltriethoxysilane | polyethyleneglycol diacrylate* | polymethyl methacrylate | 18 μ | 6 H | 10.5 | no change | no change | 92 % | Not fogged when breathed on in an atmosphere at 10° C. |

*Average number of C$_2$H$_4$O unit is 14.

Table 2

| Ex. No. | Component (A) | Component (B) | Substrate material | Thickness of coating | Pencil hardness | Haze value (%) | Anti-fogging property |
| --- | --- | --- | --- | --- | --- | --- | --- |
| 11. | tetraethoxysilane | diethyleneglycol diacrylate | polymethyl methacrylate | 15 μ | 6 H | 10.4 | Not fogged when transferred from open air at 10° C into a room at 25° C. |
| 12. | tetramethoxysilane | methoxytetraethyleneglycol monomethacrylate | diethyleneglycol bis-allylcarbonate polymer | 12 μ | 6 H | 10.6 | Not fogged when transferred from open air at 10° C into a room at 25° C. |
| 13. | tetrapropoxysilane | tetraethyleneglycol monomethacrylate | diethyleneglycol bis-allylcarbonate polymer | 20 μ | 6 H | 11.9 | Not fogged when transferred from open air at 10° C into a room at 25° C. |
| 14. | vinyltrimethoxysilane | methoxytriethyleneglycol monomethacrylate | polymethyl methacrylate | 10 μ | 6 H | 12.6 | Not fogged when breathed upon in an atmosphere at 10° C. |
| 15. | vinylmethyl diethoxysilane | triethyleneglycol monoacrylate | polycarbonate | 10 μ | 5 H | 14.0 | Not fogged when breathed upon in an atmosphere at 10° C. |
| 16. | γ-methacryloxypropyltrimethoxysilane | tetraethyleneglycol monomethacrylate | polymethyl methacrylate | 15 μ | 6 H | 12.2 | Not fogged when breathed upon in an atmosphere at 10°C. |
| 17. | β-methacryloxyethyltriethoxysilane | polyethyleneglycol dimethacrylate* | polystyrene | 9 μ | 6 H | 12.0 | Not fogged when breathed upon in an atmosphere at 10° C. |

*Average number of C$_2$H$_4$O unit is 12.

Table 3

| Ex. No. | Component (A) | Component (B) | Substrate material | Thickness of coating | Haze value (%) | Anti-fogging property |
| --- | --- | --- | --- | --- | --- | --- |
| 18. | γ-glycidoxyethyltrimethoxysilane | polyethyleneglycol di-methacrylate* (100 parts) & acrylic acid (100 parts) | polycarbonate | 12 μ | 10.9 | Not fogged when exposed to steam from water bath of 50° C in a room at 10° C. |
| 19. | β-glycidoxyethyltrimethoxysilane | methoxytetraethyleneglycol methacrylate | diethyleneglycol bis-allylcarbonate polymer | 16 μ | 10.1 | Not fogged when exposed to steam from water bath of 50° C in a room at 10° C. |
| 20. | β-glycidoxyethyltriethoxysilane | pentaethyleneglycol monoacrylate (100 parts) & acrylic acid (100 parts) | ordinary glass | 20 μ | 12.8 | Not fogged when exposed to steam from water bath of 50° C in a room at 10° C. |

*Average number of C$_2$H$_4$O unit is 12.

What we claim is:

1. A curable resin composition for forming anti-fogging abrasion-resistant coating essentially consisting of:

20 – 90 parts by weight of the hydrolysate of at least one compound selected from the group consisting of compounds of the formulae

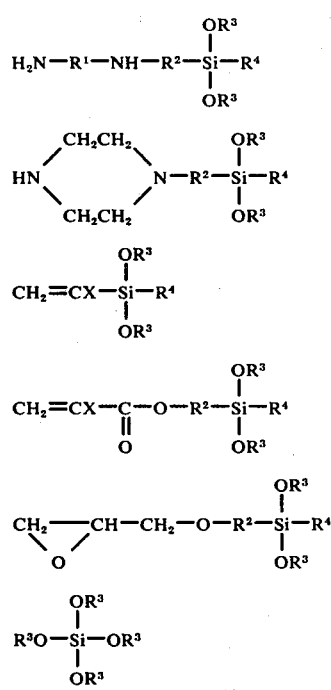

wherein $R^1$ is an alkylene group having 2 – 6 carbon atoms, $R^2$ is an alkylene group having 2 – 4 carbon atoms, $R^3$ is an alkyl group having 1 – 4 carbon atoms, $R^4$ is either $OR^3$ or an alkyl group having 1 – 3 carbon atoms, and X is either of hydrogen and methyl;
80 – 10% by weight of at least one polymerizable compound selected from the group consisting of compounds of the formulae

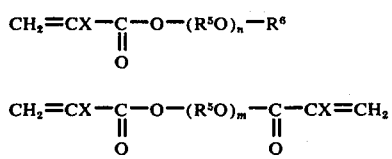

wherein $R^5$ is an alkylene group having 2 – 3 carbon atoms, $R^6$ is either of hydrogen and an alkyl group having 1 – 3 carbon atoms, X is either of hydrogen and methyl, n is an integer of 2 – 20 and m is an integer of 4 – 20, and said groups $R^1$, $R^2$, $R^3$, $R^4$, $R^5$ and $R^6$ may be staight chained or branched, whereby the total of said hydrolysate and said polymerizable compounds is 100% by weight; and 0.01 – 10% based on the total weight of the above compounds of at least one curing catalyst selected from the group consisting of hydrolysis catalysts for said silicon compounds and radical polymerization initiators.

2. The curable resin composition as claimed in claim 1, wherein $R^1$ and $R^2$ are the same or different and are each an alkylene group having 2 – 4 carbon atoms, $R^3$ is an alkyl group having 1 – 4 carbon atoms, $R^4$ is $OR^3$, n is an integer of 2 – 14 and m is an integer of 4 – 14.

3. The curable resin composition as claimed in claim 2, which essentially consists of:
35 – 85% by weight of the hydrolysate of said silicon compounds,
65 – 15% by weight of said polymerizable compounds, whereby the total of said hydrolysate and said polymerizable compounds is 100% by weight, and
0.1 – 7.5 based on the total weight of the above compounds of said curing catalyst.

4. The curable resin composition as claimed in claim 3, which essentially consists of:
50–80% weight of the hydrolysate of said silicon compounds,
50 – 20% by weight of said polymerizable compounds, whereby the total of said hydrolysate and said polymerizable compounds is 100% by weight, and
0.1 – 5.0% based on the total weight of the above compounds of said curing catalyst.

5. The curable resin composition as claimed in claim 4, wherein the curing catalyst is at least one compound selected from the group consisting of sulfuric acid, hydrochloric acid, chlorosulfonic acid, sulfuryl chloride, iron chloride, ethyl borate, cobalt naphthenate, zinc octylate, cobalt octylate, iron octylate, zinc laurate, cobalt laurate, iron laurate, ammonia, potassium hydroxide, and redox catalyst systems. hydroxide, sodium hydroxide, peroxides, hydroperoxides, dinitriles, 6. The curable resin composition as claimed in claim 1, which further contains at least one third polymerizable monomer selected from the group consisting of methyl acrylate, ethyl acrylate, propyl acrylates, butyl acrylates, methyl methacrylate, ethyl methacrylate, propyl methacrylates, butyl methacrylates, hydroxyethyl acrylate, hydroxypropyl acrylate, hydroxyethyl methacrylate, hydroxypropyl acrylate, hydroxypropyl methacrylate, 2-ethylhexyl acrylate, cyclohexyl acrylate, lauryl methacrylate, stearyl methacrylate, benzyl methacrylate, phenyl methacrylate, methacrylic acid, styrene, α-methylstyrene, vinyltoluene, vinylpyrrolidone, acrylamide, methacrylamide, acrylonitrile, methacrylonitrile, tribromophenyl methacrylate, methacryloxyethyl phosphate, tri-methacryloxyethyl phosphate, diallyl phthalate, triallyl cyanurate, epoxy acrylate ethyleneglycol dimethacrylate, ethyleneglycol diacrylate, diethyleneglycol dimethacrylate, diethyleneglycol diacrylate, triethylene glycol dimethacrylate, tri-ethyleneglycol diacrylate, triacrylformal, methylolacrylamide, methyl-bis-acrylamide, diethyleneglycol bis-allylcarbonate, propargyl maleate, propargyl fumarate, diallyl maleate, diallyl fumarate, diallyl itaconate, and diallyl succinate, in an amount not more than 30% by weight of the total amount of the hydrolysate of said silicon compounds and said polymerizable compounds of formulas VII or VIII.

7. The curable resin composition as claimed in claim 6, wherein $R^1$ and $R^2$ are the same or different and are each respectively an alkylene group having 2 – 4 carbon atoms, $R^3$ is an alkyl group having 1 – 4 carbon atoms, $R^4$ is $OR^3$, n is an integer of 2 – 12 and m an integer of 4 – 12.

8. The curable resin composition as claimed in claim 7, which essentially consists of:
35 – 85% by weight of the hydrolysate of said silicon compounds,
65 – 15% by weight of said polymerizable compounds, whereby the total of said hydrolysate and said polymerizable compounds is 100% by weight,
0.1 – 7.5% based on the total weight of the above compounds of said catalyst, and not more than 20% based on the total weight of said silicon compounds and said polymerizable compounds of at least one compounds selected from the groups consisting of methyl acrylate, ethyl acrylate, propyl acrylates, butyl acrylates, methyl methacrylate, ethyl methacrylate, propyl methacrylates, butyl methacrylates, hydroxyethyl acrylate, hydroxypropyl acrylate, hydroxyethyl methacrylate, hydroxypropyl methacrylate, lauryl methacrylate, stearyl methacrylate, acrylic acid, methacrylic acid, styrene, vinyltoluene, vinylpyrrolidone, acrylamide, methacrylamide, acrylonitrile, methacrylonitrile, ethyleneglycol acrylate, ethyleneglycol methacrylate, diethylene glycol dimethacrylate, diethyleneglycol diacrylate, triethyleneglycol dimethacrylate, and triethyleneglycol diacrylate.

9. The curable resin composition as claimed in claim 8, which essentially consists of:
50 – 80% by weight of said polymerizable compounds, whereby the total of said hydrolysate and said polymerizable compounds is 100% by weight, 0.1 – 5.0% based on the total weight of the above hydrolysate and the polymerizable compounds of said curing catalysts, and
not more than 10% based on the total weight of the above hydrolysate and the polymerizable compounds of at least one monomer selected from the group consisting of methyl acrylate, methyl methacrylate, ethyl acrylate, ethyl methacrylate, hydroxyethyl acrylate, hydroxyethyl methacrylate, lauryl methacrylate, acrylic acid, methacrylic acid, acrylamide, acrylonitrile, styrene, vinylpyrrolidone, diethyleneglycol diacrylate, diethyleneglycol dimethacrylate, triethyleneglycol dimethacrylate and triethyleneglycol diacrylate.

10. The curable resin composition as claimed in claim 9, wherein said curing catalyst is at least one material selected from the group consisting of hydrochloric acid, chlorosulfuric acid, sulfuric acid, sulfuryl chloride, iron chloride, ethyl borate, cobalt naphthenate, zinc octylate, cobalt octylate, iron octyolate, zinc laurate, cobalt laurate, iron laurate, ammonia, potassium hydroxide, sodium hydroxide, peroxides, hydroperoxides, dinitriles and redox catalyst systems.

* * * * *